United States Patent
Lin et al.

(10) Patent No.: US 11,814,830 B2
(45) Date of Patent: Nov. 14, 2023

(54) SHOWER PLUG BRACKET AND MOVING ASSEMBLY

(71) Applicant: Jomoo Kitchen & Bath Co., Ltd., Nan'an (CN)

(72) Inventors: Xiaofa Lin, Nan'an (CN); Xiaoshan Lin, Nan'an (CN); Bing Liu, Nan'an (CN); Liwen Tu, Nan'an (CN); Aiyun Shu, Nan'an (CN); Kunpeng Huang, Nan'an (CN)

(73) Assignee: Jomoo Kitchen & Bath Co., Ltd., Fujian (CN)

( * ) Notice: Subject to any disclaimer, the term of this patent is extended or adjusted under 35 U.S.C. 154(b) by 238 days.

(21) Appl. No.: 17/358,118

(22) Filed: Jun. 25, 2021

(65) Prior Publication Data
US 2022/0025622 A1    Jan. 27, 2022

(30) Foreign Application Priority Data

Jul. 22, 2020  (CN) .......................... 202021462499.5

(51) Int. Cl.
*E03C 1/06*   (2006.01)
*B05B 1/18*   (2006.01)

(52) U.S. Cl.
CPC ................ *E03C 1/06* (2013.01); *B05B 1/185* (2013.01)

(58) Field of Classification Search
CPC . E03C 1/06; E03C 1/066; B05B 1/185; B05B 15/68; F16B 7/433; F16B 7/0473
USPC ..................................... 4/596, 567, 618, 670
See application file for complete search history.

(56) References Cited

U.S. PATENT DOCUMENTS

| | | | | |
|---|---|---|---|---|
| 2,602,699 A | * | 7/1952 | Otto | E03C 1/046 422/282 |
| 3,978,529 A | * | 9/1976 | Krafft | A47K 4/00 4/663 |
| 5,545,314 A | * | 8/1996 | Parise | E03C 1/0409 4/615 |
| 7,458,112 B1 | * | 12/2008 | Yang | E03C 1/06 4/570 |
| 2013/0074255 A1 | * | 3/2013 | Uncles | E03C 1/0408 4/601 |

FOREIGN PATENT DOCUMENTS

| | | | | | |
|---|---|---|---|---|---|
| CN | 114562000 A | * | 5/2022 | ........... | B05B 15/061 |
| CN | 218720004 U | * | 11/2022 | ........... | B05B 15/061 |
| EP | 2444706 A1 | * | 4/2012 | ........... | B05B 15/061 |

* cited by examiner

*Primary Examiner* — Lori L Baker
(74) *Attorney, Agent, or Firm* — COOPER LEGAL GROUP, LLC

(57) ABSTRACT

A shower plug bracket and a moving assembly are provided. The shower plug bracket includes a base and a plug bracket portion. The plug bracket portion is configured to rotate up and down to adjust a use angle, the two cooperate with a locking structure, the locking structure includes a first component and a second component, the first component is connected to the base, the second component is disposed on the plug bracket portion, the first component is disposed with first teeth, the second component is disposed with second teeth, and the first teeth are engaged with the second teeth. When the plug bracket portion rotates upward or downward, the first teeth of the first component are disengaged from the second teeth of the second component. When the plug bracket portion stops rotating, the first teeth and the second teeth reset to an engaged state.

20 Claims, 4 Drawing Sheets

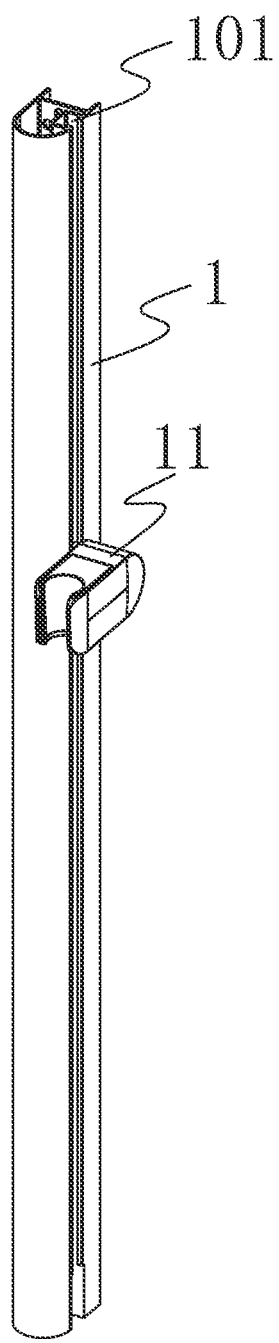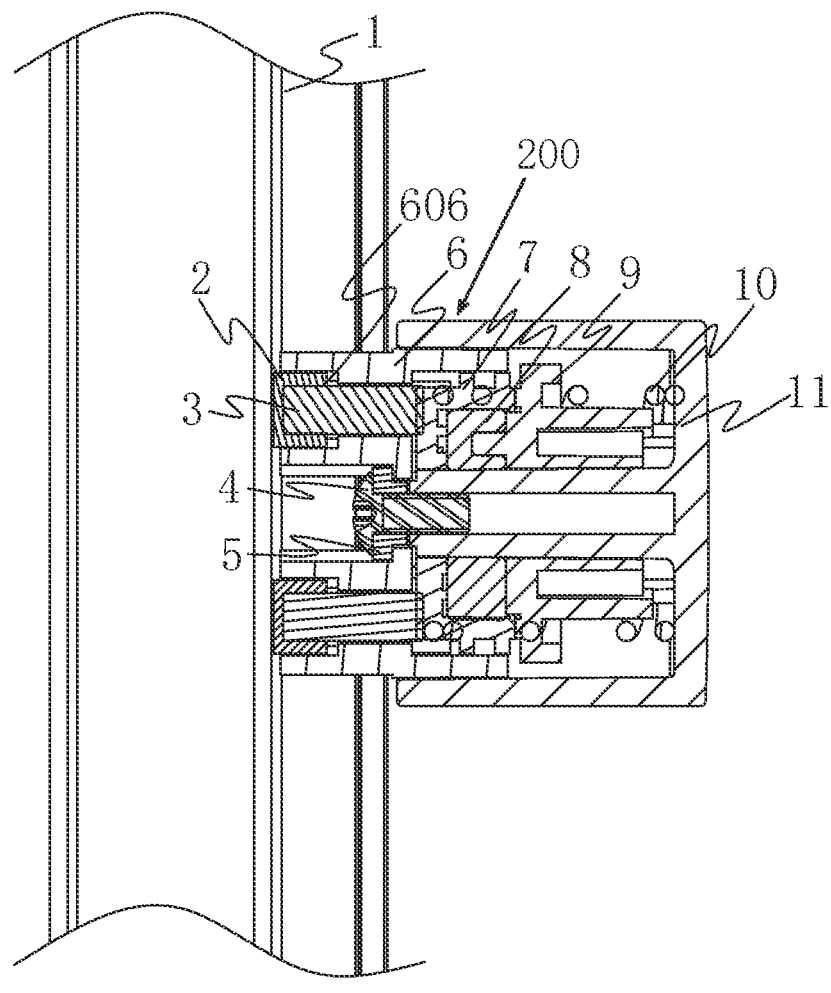
Fig. 9
Fig. 10

SHOWER PLUG BRACKET AND MOVING ASSEMBLY

RELATED APPLICATIONS

This application claims priority to Chinese patent application number 202021462499.5, filed Jul. 22, 2020. Chinese patent application 202021462499.5 is incorporated herein by reference.

FIELD OF THE DISCLOSURE

The present disclosure relates to sanitary wares, and in particular relates to a shower plug bracket and a moving assembly.

BACKGROUND OF THE DISCLOSURE

Shower plug brackets and moving assemblies are configured to be plugged with a shower, and plug bracket portions of some shower plug brackets and some moving assemblies have the function of rotating up and down to adjust a use angle of the plugged-in shower. A shower plug bracket and a moving assembly with an angle adjustment function of the existing techniques uses hard mechanical teeth to switch the rotation gear position when rotating. However, the use of hard mechanical teeth has the following disadvantages: when rotating, the hard mechanical teeth collide with each other, resulting in loud noise. The hard mechanical teeth have a short service life after a long-term collision without cushioning.

BRIEF SUMMARY OF THE DISCLOSURE

The present disclosure provides a shower plug bracket and a moving assembly with low noise and a long service life to solve the technical problem of the existing techniques.

In order to solve the technical problem, a technical solution of the present disclosure is as follows.

A shower plug bracket comprises a base, and a plug bracket portion configured to be disposed with a shower. The plug bracket portion is connected to the base and is configured to rotate up and down to adjust a use angle, the plug bracket portion and the base cooperate with a locking structure, the locking structure comprises a first component and a second component, the first component is connected to the base, the second component is disposed on the plug bracket portion, the first component is disposed with a plurality of first teeth, the second component is disposed with a plurality of second teeth, and the plurality of first teeth of the first component are engaged with the plurality of second teeth of the second component to form an elastic gear position. When the plug bracket portion rotates upward or downward, the plurality of first teeth of the first component are disengaged from the plurality of second teeth of the second component. When the plug bracket portion stops rotating, the plurality of first teeth of the first component and the plurality of second teeth of the second component are reset to an engaged state.

In an embodiment, the second component and the plurality of second teeth of the second component or merely the plurality of second teeth are configured to be elastically deformed, and the second component and the plug bracket portion are coaxially connected with each other and are not configured to rotate relatively.

In an embodiment, an inner wall surface of the first component is circumferentially disposed with the plurality of first teeth and an outer wall surface of the second component is circumferentially disposed with the plurality of second teeth, or one end of the first component is circumferentially disposed with the plurality of first teeth and one end of the second component is circumferentially disposed with the plurality of second teeth.

In an embodiment, the plurality of second teeth of the second component are arranged into a plurality of tooth groups, each tooth group of the plurality of tooth groups comprises a plurality of adjacent second teeth, the plurality of tooth groups are disposed at intervals in a circumference direction of the second component, the first component is an inner member, and the second component is a rubber pad.

In an embodiment, the base is disposed on a rod and is configured to be lifted up and lowered down, the base is disposed with a friction pad configured to abut the rod to limit movement of the base, the first component and the base cooperate with a driving structure, and an elastic member cooperates with and is disposed between the first component and the plug bracket portion. When the plug bracket portion rotates upward or downward, the first component is driven to move in a direction away from the friction pad to enable the friction pad to be disengaged from the rod. When the plug bracket portion stops rotating, the first component is driven to move in a direction toward the friction pad to enable the friction pad to be reset to a state in which the friction pad abuts the rod.

In an embodiment, the base is disposed with a hollow inner cavity, the driving structure comprises a plurality of inclined platforms circumferentially disposed on a cavity wall of the hollow inner cavity of the base and a plurality of protrusions circumferentially disposed on an outer wall surface of the first component, the cavity wall of the hollow inner cavity of the base is disposed with limiting blocks respectively disposed on high ends and low ends of all inclined platforms of the plurality of inclined platforms, the first component is encompassed in the hollow inner cavity of the base, all protrusions of the plurality of protrusions slidably cooperate with inclined surfaces of the plurality of inclined platforms one-to-one and are disposed between the limiting blocks disposed on the high ends and the low ends of the plurality of inclined platforms.

In an embodiment, a pressing rod is disposed on the friction pad, the first component abuts the pressing rod or is separated from the pressing rod by an axial movement, an end of the base away from the plug bracket portion is disposed with an accommodating groove, a groove bottom of the accommodating groove is disposed with a through hole configured to enable the pressing rod to pass through and to lead to a hollow inner cavity of the base, the friction pad is disposed in the accommodating groove, a side wall of the friction pad is disposed with a reverse buckle, and the reverse buckle cooperates with a buckle hole disposed on a groove wall of the accommodating groove.

In an embodiment, the plug bracket portion comprises a plug bracket and a joint, the plug bracket is disposed with an accommodating cavity, a center of the accommodating cavity is disposed with a support column, the plug bracket is rotatably connected to the base by the support column, the joint and the second component are disposed in the accommodating cavity and both encompass the support column of the plug bracket, the joint and the plug bracket cooperate with a first anti-rotation structure, and the joint and the second component cooperate with a second anti-rotation structure.

In an embodiment, the base is connected to the support column by a screw, a thread portion of the screw is screwed to the support column, a head portion of the screw and the base are separated by an anti-rotation pad, and the anti-rotation pad and the support column cooperate with a third anti-rotation structure.

In an embodiment, the first anti-rotation structure comprises a plurality of first limiting protruding platforms disposed on a bottom surface of the accommodating cavity and disposed about the support column and a plurality of first limiting grooves circumferentially disposed on one end of the joint away from the second component, the plurality of first limiting protruding platforms cooperate with the plurality of first limiting grooves one-to-one, the plurality of first limiting protruding platforms comprise radial segments and arc segments, the arc segments are disposed on outer ends of the radial segments, centers of circles of the arc segments face inward, the radial segments cooperate with the plurality of first limiting grooves, the elastic member is a spring, the spring encompasses the joint, one end of the spring abuts the joint, and another end of the spring encompasses the arc segments of all first limiting protruding platforms of the plurality of first limiting protruding platforms.

In an embodiment, the second anti-rotation structure comprises a plurality of second limiting protruding platforms circumferentially disposed on one end of the joint adjacent to the second component and a plurality of second limiting grooves circumferentially disposed on the second component, the plurality of second limiting protruding platforms cooperate with the plurality of second limiting grooves one-to-one, the third anti-rotation structure comprises a plurality of third limiting protruding platforms circumferentially disposed on the anti-rotation pad and a plurality of third limiting grooves circumferentially disposed on a tail end of the support column, and the plurality of third limiting protruding platforms cooperate with the plurality of third limiting grooves one-to-one.

The present disclosure further discloses a moving assembly, which comprises the rod and the shower plug bracket. The base is disposed on the rod and is configured to be lifted up and lowered down, and the friction pad abuts the rod.

In an embodiment, the rod is disposed with an elongated sliding groove in an up and down direction, a groove opening of the elongated sliding groove defines a narrowed-opening shape, the base is slidably disposed in the elongated sliding groove, and the friction pad abuts a groove bottom surface of the elongated sliding groove.

Compared with the existing techniques, the technical solution has the following advantages.

1. The locking structure comprises the first component and the second component. The plurality of first teeth of the first component are engaged with the plurality of second teeth of the second component to form an elastic gear position. When the plug bracket portion rotates upward or downward, the plurality of first teeth of the first component are disengaged from the plurality of second teeth of the second component, and when the plug bracket portion stops rotating, the plurality of first teeth of the first component and the plurality of second teeth of the second component are reset to an engaged state. In this way, the locking structure of the present disclosure forms the elastic gear position, and there is no noise when rotating. At the same time, the elastic gear position is configured to be deformed to step aside during rotation. It has a certain buffer effect and has a longer service life.

2. The plurality of second teeth of the second component are arranged into a plurality of tooth groups, and the plurality of tooth groups are disposed along a circumference of the second component at intervals. This not only ensures a locking effect of the first component and the second component with respect to the plug bracket portion, but also reduces the number of second teeth, thereby reducing a relative rotation resistance between the first component and the second component and making the operation easier.

3. The base is disposed on the rod and is configured to be lifted up and lowered down, and the base is disposed with the friction pad configured to abut the rod to limit movement of the base. The first component and the base cooperate with a driving structure. When the plug bracket portion rotates upward or downward, the first component is driven to move in a direction away from the friction pad to enable the friction pad to be disengaged from the rod. An elastic piece cooperates with and is disposed between the first component and the plug bracket portion. When the plug bracket portion stops rotating, the first component is driven to move in a direction toward the friction pad, so that the friction pad is reset to a state in which the friction pad abuts the rod. In this way, the shower plug bracket of the present disclosure also has a lifting and lowering function, forces for rotation and engaging-and-disengaging for the lifting and lowering are not in the same direction, the engaging-and-disengaging operation and the rotating operation do not interfere with each other, and the hand feeling is good.

4. The driving structure comprises a plurality of inclined platforms circumferentially disposed on the cavity wall of the hollow inner cavity of the base and a plurality of protrusions circumferentially disposed on the outer wall surface of the first component. The cavity wall of the hollow inner cavity of the base is disposed with limiting blocks respectively disposed on the high ends and the low ends of all inclined platforms. The first component is encompassed in the hollow inner cavity of the base, and all protrusions of the first component slidably cooperate with the inclined surfaces of the inclined platforms of the base one-to-one and are disposed between limiting blocks disposed on the high ends and the low ends of the inclined platforms. The design of the driving structure is not only very simple, but also the rotation of the first component is limited when the first component moves into a specified position in the axial direction.

5. The base is connected to the support column by a screw. The thread portion of the screw is screwed to the support column, and the head portion of the screw is separated from the base by an anti-rotation pad. The anti-rotation pad and the support column cooperate with the third anti-rotation structure, so that the screw is prevented from being loosened due to the torsion force, thereby increasing a rotation life of the product.

The present disclosure will be further described below in combination with the accompanying drawings and embodiments. However, the shower plug bracket and the moving assembly of the present disclosure are not limited to the embodiments.

BRIEF DESCRIPTION OF THE DRAWINGS

FIG. 9 illustrates a perspective view of the present disclosure when a shower plug bracket is disposed on a rod; and FIG. 10 illustrates a cross-sectional view of the present disclosure when the shower plug bracket is disposed on the rod.

DETAILED DESCRIPTION OF THE EMBODIMENTS

Figure 1:
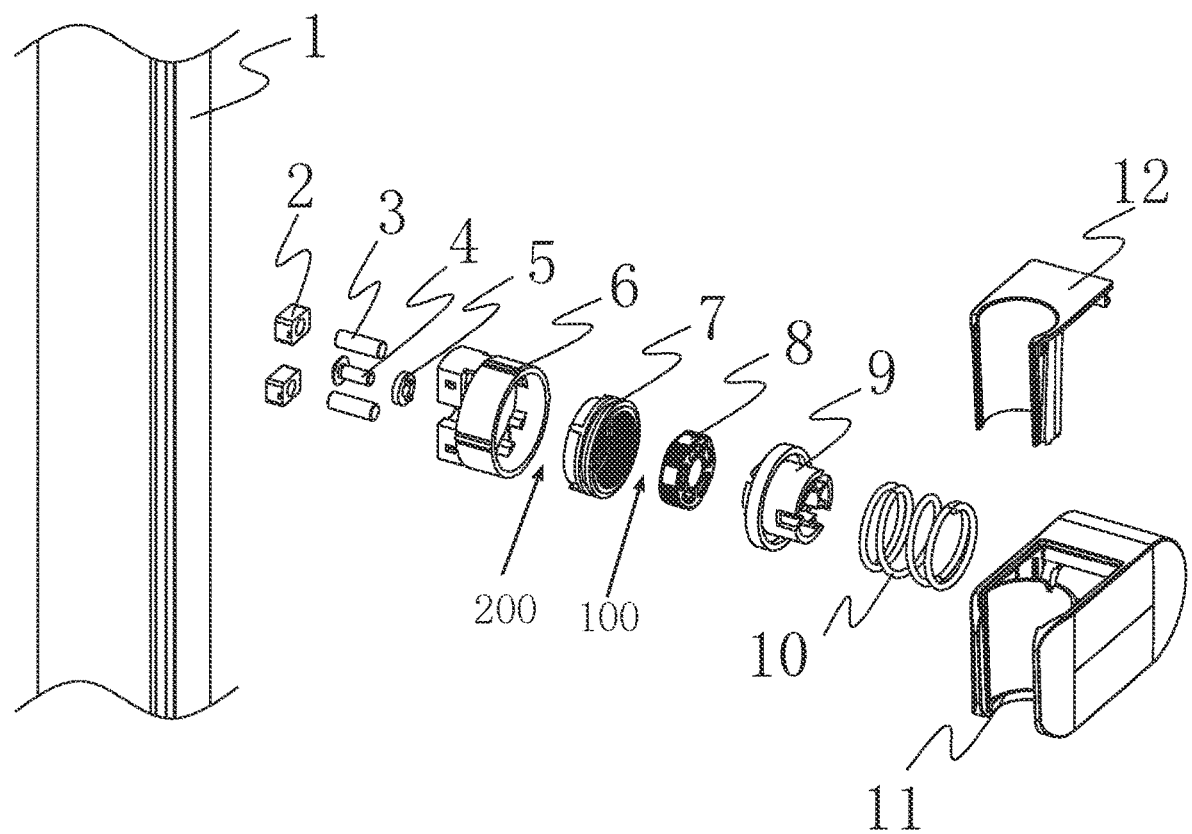
FIG. 1 illustrates an exploded view of the present disclosure.
Figure 2:
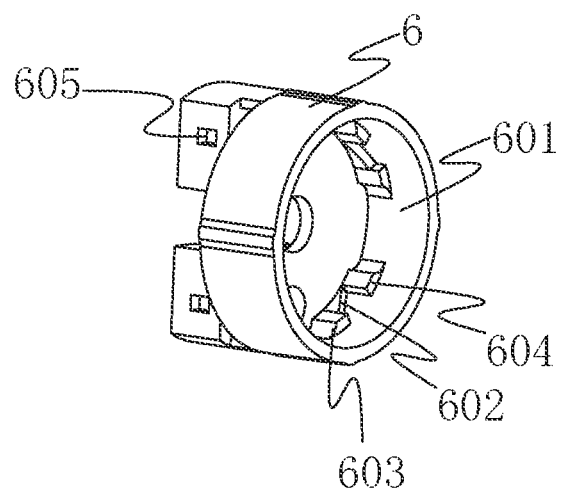
FIG. 2 illustrates a perspective view of a base of the present disclosure.
Figure 3:
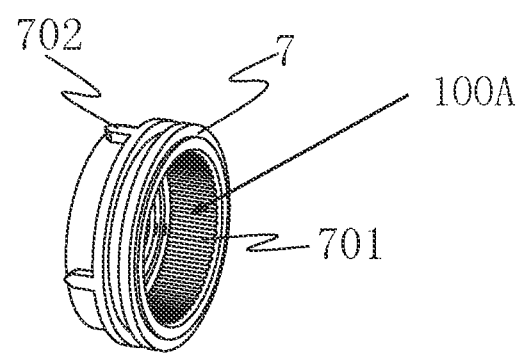
FIG. 3 illustrates a perspective view of an inner member of the present disclosure.
Figure 4:
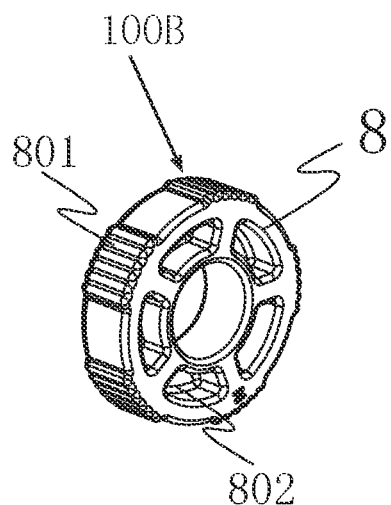
FIG. 4 illustrates a perspective view of a rubber pad of the present disclosure.
Figure 5:
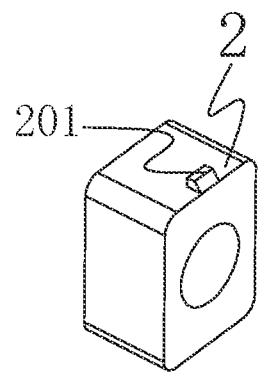
FIG. 5 illustrates a perspective view of a friction pad of the present disclosure.
Figure 6:
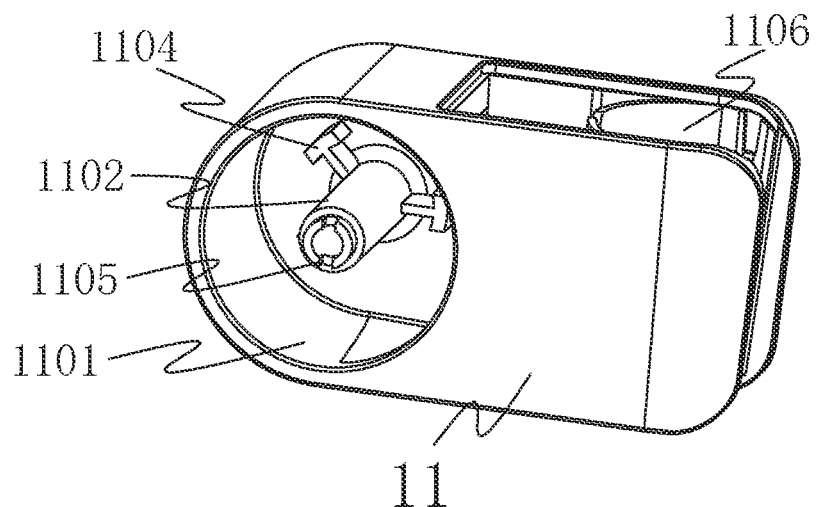
FIG. 6 illustrates a perspective view of a plug bracket of the present disclosure.
Figure 7:
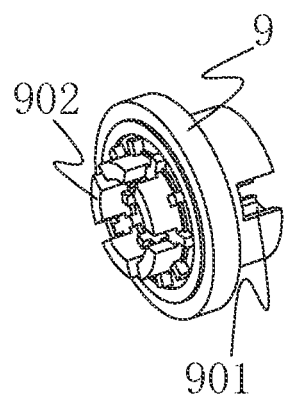
FIG. 7 illustrates a perspective view of a joint of the present disclosure.
Figure 8:
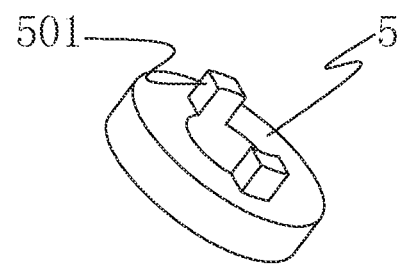
FIG. 8 illustrates a perspective view of an anti-rotation pad of the present disclosure.

Referring to FIGS. 1-10, a shower plug bracket of the present disclosure comprises a base 6 and a plug bracket portion configured to be plugged with a shower. The plug bracket portion is connected to the base 6 and is configured to rotate up and down to adjust a use angle, and the plug bracket portion and the base 6 cooperate with a locking structure 100. The locking structure 100 comprises a first component 100A and a second component 100B. The first component 100A is connected to the base 6, and the second component 100B is disposed on the plug bracket portion. The first component 100A is circumferentially disposed with a plurality of first teeth 701, the second component 100B is circumferentially disposed with a plurality of second teeth 801, and the plurality of first teeth 701 are engaged with the plurality of second teeth 801 to form an elastic gear position. When the plug bracket portion rotates upward or downward, the plurality of first teeth 701 of the first component 100A are disengaged from the plurality of second teeth 801 of the second component 100B. When the plug bracket portion stops rotating, the plurality of first teeth 701 of the first component 100A and the plurality of second teeth 801 of the second component 100B reset to an engaged state.

In this embodiment, the first component 100A and the plurality of first teeth 701 thereof are not elastically deformable and are connected to the base 6. The second component 100B and the plurality of second teeth 801 thereof or merely the plurality of second teeth 801 are elastically deformable, are coaxially connected to the plug bracket portion, and are not configured to rotate relative to each other. In detail, the first component 100A is an inner member 7, and the second component 100B is a rubber pad 8 (the second component 100B is made of rubber, but the disclosure is not limited to thereto). The inner member 7 and the rubber pad 8 are both hollow sleeves. An inner wall surface of the inner member 7 is disposed with the plurality of first teeth 701, and an outer wall surface of the rubber pad 8 is disposed with the plurality of second teeth 801. The plurality of second teeth 801 of the rubber pad 8 are divided into a plurality of tooth groups. All tooth groups of the plurality of tooth groups respectively comprises a plurality of adjacent second teeth, and the plurality of tooth groups are disposed at intervals along a circumferential direction of the rubber pad 8 (an interval between adjacent tooth groups is greater than an interval between adjacent second teeth in each tooth group). In other embodiments, the first component 100A and the plurality of first teeth 701 thereof are elastically deformable or merely the plurality of first teeth 701 is elastically deformable.

In this embodiment, the base 6 is disposed on a rod 1 and is configured to be lifted up and lowered down, and the base 6 is disposed with one or more friction pads 2 configured to abut the rod 1 to limit movement of the base 6. The inner member 7 and the base 6 cooperate with a driving structure 200. When the plug bracket portion rotates upward or downward, the inner member 7 is driven to move in a direction away from the one or more friction pads 2, so that the one or more friction pads 2 are disengaged from the rod 1. An elastic member cooperates with and is disposed between the inner member 7 and the plug bracket portion. When the plug bracket portion stops rotating, the inner member 7 is driven to move in a direction adjacent to (i.e., toward) the one or more friction pads 2, so that the one or more friction pads 2 are reset to states in which the one or more friction pads 2 abut the rod 1. The number of friction pads 2 is two, but the disclosure is not limited thereto, and the two friction pads 2 are disposed up and down.

In this embodiment, the base 6 comprises a hollow inner cavity 601, and the driving structure 200 comprises a plurality of inclined platforms 602 circumferentially disposed on a cavity wall of the hollow inner cavity 601 of the base 6 and a plurality of protrusions 702 circumferentially disposed on an outer wall surface of the inner member 7. The cavity wall of the hollow inner cavity 601 of the base 6 is disposed with limiting blocks 603 and 604 respectively disposed on high ends and low ends of all inclined platforms of the plurality of inclined platforms 602. The inner member 7 is encompassed in the hollow inner cavity 601 of the base 6, and all protrusions of the plurality of protrusions 702 slidably cooperate with inclined surfaces of the plurality of inclined platforms 602 of the base 6 one-to-one and are disposed between the limiting blocks 603 and 604 respectively disposed on the high ends and the low ends of the plurality of inclined platforms 602. The plurality of protrusions 702 define elongated-shapes, and tail ends of the plurality of protrusions 702 are ridge-shaped, but the shape of the plurality of protrusions 702 is not limited thereto.

In this embodiment, each of the one or more friction pads 2 is plugged with a pressing rod 3, and the inner member 7 abuts the pressing rod 3 or is separated from the pressing rod 3 by an axial movement. One end of the base 6 away from the plug bracket portion is disposed with an accommodating groove 606, and a groove bottom of the accommodating groove 606 is disposed with a through hole configured to enable the pressing rod 3 to pass through and to lead to the hollow inner cavity 601 of the base 6. Each of the one or more friction pads 2 is disposed on the accommodating groove 606, and a side wall of each of the one or more friction pads 2 is disposed with a reverse buckle 201. The reverse buckle 201 cooperates with a buckle hole 605 disposed on a groove wall of the accommodating groove 606.

In this embodiment, the plug bracket portion comprises a plug bracket 11 and a joint 9. The plug bracket 11 is disposed with an accommodating cavity 1101. A center of the accommodating cavity 1101 is disposed with a support column 1102, and the plug bracket 11 is rotatably connected to the base 6 by the support column 1102. The joint 9 and the rubber pad 8 are disposed in the accommodating cavity 1101 of the plug bracket 11 and both encompass the support column 1102 of the plug bracket 11. The joint 9 and the plug bracket 11 cooperate with a first anti-rotation structure, and the joint 9 and the rubber pad 8 cooperate with a second anti-rotation structure. A side surface of one end of the plug bracket 11 is disposed with the accommodating cavity 1101, and the other end of the plug bracket 11 is disposed with an insert groove 1106 configured to be plugged with a shower. A decorative cover 12 is disposed on the insert groove 1106.

In this embodiment, the base 6 is connected to the support column 1102 by a screw 4, and a thread portion of the screw 4 is screwed to the support column 1102. A head portion of the screw 4 is separated from the base 6 by an anti-rotation pad 5, and the anti-rotation pad 5 and the support column 1102 cooperate with a third anti-rotation structure.

In this embodiment, the first anti-rotation structure comprises a plurality of first limiting protruding platforms 1104 disposed on a bottom surface of the accommodating cavity 1101 and disposed about the support column 1102 and a plurality of first limiting grooves 901 circumferentially disposed on an end of the joint 9 away from the rubber pad 8. The plurality of first limiting protruding platforms 1104 cooperate with the plurality of first limiting grooves 901 one-to-one. The plurality of first limiting protruding platforms 1104 comprise radial segments and arc segments. The arc segments are disposed on outer ends of the radial segments, and centers of circles of the arc segments face inward. The radial segments cooperate with the plurality of first limiting grooves 901. The elastic member is a spring 10, and the spring 10 encompasses the joint 9. One end of the spring 10 abuts the joint 9, and the other end of the spring 10 encompass the arc segments of all first limiting protruding platforms of the plurality of first limiting protruding platforms 1104.

In this embodiment, the second anti-rotation structure comprises a plurality of second limiting protruding platforms 902 circumferentially disposed on an end of the joint 9 adjacent to the rubber pad 8 and a plurality of second limiting grooves 802 circumferentially disposed on the rubber pad 8. The plurality of second limiting protruding platforms 902 cooperate with the plurality of second limiting grooves 802 one-to-one. The third anti-rotation structure comprises a plurality of third limiting protruding platforms 501 circumferentially disposed on the anti-rotation pad 5 and a plurality of third limiting grooves 1105 circumferentially disposed on a tail end of the support column 1102. The plurality of third limiting protruding platforms 501 cooperate with the plurality of third limiting groove 1105 one-to-one. When the plug bracket 11 and the base 6 rotate relatively, the anti-rotation pad 5 and the screw 4 rotate together with the plug bracket 11, and a torsion force applied on the plug bracket 11 is transmitted to the screw 4 due to a cooperation of the plurality of third limiting protruding platforms 501 and the plurality of third limiting grooves 1105 instead of being directly transmitted to the screw 4 through a thread. The screw 4 is therefore prevented from being loosened by the torsion force, thereby improving a rotation life of the product.

When the shower plug bracket of the present disclosure is in use, the base 6 needs to be disposed on the rod 1. When a use angle of the plug bracket 11 needs to be increased, the plug bracket 11 only needs to rotate upward. The plug bracket 11 receives an upward torque force, and the upward torque force is transmitted to the inner member 7 by the joint 9 and the rubber pad 8. The inner member 7 and the base 6 rotate relatively, and all protrusions of the plurality of protrusions 702 of the outer wall surface of the inner member 7 are configured to rotate and move towards the high ends of the inclined surfaces of corresponding inclined platforms of the plurality of inclined platforms 602, thereby pushing the inner member 7 to move away from the one or more friction pads 2. The spring 10 is compressed, so that a pressing surface (an end surface of the inner member 7 facing the pressing rod 3) of the inner member 7 is separated from the pressing rod 3, and the one or more friction pads 2 are disengaged from the rod 1. When all protrusions of the plurality of protrusions 702 of the outer wall surface of the inner member 7 rotate to tightly abut the limiting blocks 603 disposed on the high ends of the corresponding inclined platforms 602, the inner member 7 and the base 6 no longer rotate. At this time, a rotation torque is increased to enable the plurality of second teeth 801 of the rubber pad 8 to be separated from the plurality of first teeth 701 of the inner member 7, so that the plug bracket 11 rotates upward to adjust the use angle. When the torsion force applied to the plug bracket 11 is removed, the spring 10 resets to push the inner member 7 to move, all protrusions of the plurality of protrusions 702 of the inner member 7 respectively rotate and move toward the low ends of the inclined surfaces of the corresponding inclined platforms of the plurality of inclined platforms 602, so that the pressing surface of the inner member 7 tightly abuts the pressing rod 3 again to enable the one or more friction pads 2 to abut the rod 1 again, and the shower plug bracket is fixed.

When the use angle of the plug bracket 11 needs to be decreased, the plug bracket 11 needs to only rotate downward. The plug bracket 11 is subjected to a downward torsion force, and the downward torsion force is transmitted to the inner member 7. The inner member 7 and the base 6 cannot rotate relatively due to all protrusions of the plurality of protrusions 702 of the outer wall surface of the inner member 7 respectively tightly abutting the limiting blocks 604 disposed on the low ends of the corresponding inclined platforms 602, so the plurality of second teeth 801 of the rubber pad 8 are separated from the plurality of first teeth 701 of the inner member 7, and the plug bracket 11 rotates downward to decrease the use angle.

When the entire shower plug bracket needs to be lifted up or lowered down, the plug bracket 11 needs to only rotate upward. The plug bracket 11 is subjected to an upward torque force, and the upward torque force is transmitted to the inner member 7 through the joint 9 and the rubber pad 8. The base 6 and the inner member 7 rotate relatively, and all protrusions of the plurality of protrusions 702 of the outer wall surface of the inner member 7 rotate and move toward the high ends of the inclined surfaces of the corresponding inclined platforms of the plurality of inclined platforms 602, thereby pushing the inner member 7 to move away from the one or more friction pads 2. The spring 10 is compressed, and the pressing surface of the inner member 7 (the end surface of the inner member 7 facing the pressing rod 3) is separated from the pressing rod 3, so that the one or more friction pads 2 are disengaged from the rod 1. The base 6 is configured to move upward or downward along the rod 1, so that a lifting and lowering adjustment of the entire shower plug bracket is achieved.

Referring to FIGS. 1-10, a moving assembly of the present disclosure comprises the rod 1 and further comprises the shower plug bracket of the present disclosure. The base 6 is disposed on the rod 1 and is configured to be lifted up and lowered down. The one or more friction pads 2 abut the rod 1.

In this embodiment, the rod 1 is disposed with an elongated sliding groove 101 along an up and down direction (i.e., in a vertical direction), and a groove opening of the elongated sliding groove 101 defines a narrowed-opening shape. The base 6 is slidably disposed in the elongated sliding groove 101, and the one or more friction pads 2 abut a groove bottom surface of the elongated sliding groove 101.

In the moving assembly of the present disclosure, the shower plug bracket has a use angle adjustment function and a lifting and lowering function. In detail, an application process of the use angle adjustment function and the lifting and lowering function are described above and will not be further described here.

The present disclosure discloses the shower plug bracket and the moving assembly. The inner member 7 and the rubber pad 8 cooperate with each other to form the elastic gear position, and there is no noise when rotating. At the same time, the elastic gear position is configured to be deformed to step aside (i.e., to be spaced apart from each other) during rotation. It has a certain cushioning effect and has a longer service life.

The aforementioned embodiments are merely some embodiments the shower plug bracket and the moving assembly of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A shower plug bracket, comprising:
   a base, and
   a plug bracket portion configured to be disposed with a shower, wherein:
   the plug bracket portion is connected to the base and is configured to rotate up and down to adjust a use angle,
   the plug bracket portion and the base cooperate with a locking structure,
   the locking structure comprises a first component and a second component,
   the first component is connected to the base,
   the second component is disposed on the plug bracket portion,
   the first component is disposed with a plurality of first teeth,
   the second component is disposed with a plurality of second teeth,
   the plurality of first teeth of the first component are engaged with the plurality of second teeth of the second component to form an elastic gear position,
   when the plug bracket portion rotates upward or downward, the plurality of first teeth of the first component are disengaged from the plurality of second teeth of the second component, and
   when the plug bracket portion stops rotating, the plurality of first teeth of the first component and the plurality of second teeth of the second component are reset to an engaged state.

2. The shower plug bracket according to claim 1, wherein:
   the second component and the plurality of second teeth of the second component or merely the plurality of second teeth are configured to be elastically deformed, and
   the second component and the plug bracket portion are coaxially connected with each other and are not configured to rotate relatively.

3. The shower plug bracket according to claim 2, wherein:
   the plurality of second teeth of the second component are arranged into a plurality of tooth groups,
   each tooth group of the plurality of tooth groups comprises a plurality of adjacent second teeth,
   the plurality of tooth groups are disposed at intervals in a circumference direction of the second component,
   the first component is an inner member,
   the second component is a rubber pad, and
   an inner wall surface of the first component is circumferentially disposed with the plurality of first teeth and an outer wall surface of the second component is circumferentially disposed with the plurality of second teeth, or
   one end of the first component is circumferentially disposed with the plurality of first teeth and one end of the second component is circumferentially disposed with the plurality of second teeth.

4. The shower plug bracket according to claim 1, wherein:
   the base is disposed on a rod and is configured to be lifted up and lowered down,
   the base is disposed with a friction pad configured to abut the rod to limit movement of the base,
   the first component and the base cooperate with a driving structure,
   an elastic member cooperates with and is disposed between the first component and the plug bracket portion,
   when the plug bracket portion rotates upward or downward, the first component is driven to move in a direction away from the friction pad to enable the friction pad to be disengaged from the rod, and
   when the plug bracket portion stops rotating, the first component is driven to move in a direction toward the friction pad to enable the friction pad to be reset to a state in which the friction pad abuts the rod.

5. The shower plug bracket according to claim 4, wherein:
   the base is disposed with a hollow inner cavity,
   the driving structure comprises a plurality of inclined platforms circumferentially disposed on a cavity wall of the hollow inner cavity of the base and a plurality of protrusions circumferentially disposed on an outer wall surface of the first component,
   the cavity wall of the hollow inner cavity of the base is disposed with limiting blocks respectively disposed on high ends and low ends of all inclined platforms of the plurality of inclined platforms,
   the first component is encompassed in the hollow inner cavity of the base,
   all protrusions of the plurality of protrusions slidably cooperate with inclined surfaces of the plurality of inclined platforms one-to-one and are disposed between the limiting blocks disposed on the high ends and the low ends of the plurality of inclined platforms.

6. The shower plug bracket according to claim 4, wherein:
   a pressing rod is disposed on the friction pad,
   the first component abuts the pressing rod or is separated from the pressing rod by an axial movement,
   an end of the base away from the plug bracket portion is disposed with an accommodating groove,
   a groove bottom of the accommodating groove is disposed with a through hole configured to enable the pressing rod to pass through and to lead to a hollow inner cavity of the base,
   the friction pad is disposed in the accommodating groove,
   a side wall of the friction pad is disposed with a reverse buckle, and
   the reverse buckle cooperates with a buckle hole disposed on a groove wall of the accommodating groove.

7. The shower plug bracket according to claim 4, wherein:
   the plug bracket portion comprises a plug bracket and a joint,
   the plug bracket is disposed with an accommodating cavity,
   a center of the accommodating cavity is disposed with a support column,
   the plug bracket is rotatably connected to the base by the support column, the joint and the second component are disposed in the accommodating cavity and both encompass the support column of the plug bracket, the joint and the plug bracket cooperate with a first anti-rotation structure, and the joint and the second component cooperate with a second anti-rotation structure.

8. The shower plug bracket according to claim 7, wherein:
the base is connected to the support column by a screw,
a thread portion of the screw is screwed to the support column,
a head portion of the screw and the base are separated by an anti-rotation pad, and
the anti-rotation pad and the support column cooperate with a third anti-rotation structure.

9. The shower plug bracket according to claim 7, wherein:
the first anti-rotation structure comprises a plurality of first limiting protruding platforms disposed on a bottom surface of the accommodating cavity and disposed about the support column and a plurality of first limiting grooves circumferentially disposed on one end of the joint away from the second component,
the plurality of first limiting protruding platforms cooperate with the plurality of first limiting grooves one-to-one,
the plurality of first limiting protruding platforms comprise radial segments and arc segments,
the arc segments are disposed on outer ends of the radial segments,
centers of circles of the arc segments face inward,
the radial segments cooperate with the plurality of first limiting grooves,
the elastic member is a spring,
the spring encompasses the joint,
one end of the spring abuts the joint, and
another end of the spring encompasses the arc segments of all first limiting protruding platforms of the plurality of first limiting protruding platforms.

10. The shower plug bracket according to claim 8, wherein:
the second anti-rotation structure comprises a plurality of second limiting protruding platforms circumferentially disposed on one end of the joint adjacent to the second component and a plurality of second limiting grooves circumferentially disposed on the second component,
the plurality of second limiting protruding platforms cooperate with the plurality of second limiting grooves one-to-one,
the third anti-rotation structure comprises a plurality of third limiting protruding platforms circumferentially disposed on the anti-rotation pad and a plurality of third limiting grooves circumferentially disposed on a tail end of the support column, and
the plurality of third limiting protruding platforms cooperate with the plurality of third limiting grooves one-to-one.

11. A moving assembly, comprising:
the rod, and
the shower plug bracket according to claim 4.

12. The moving assembly according to claim 11, wherein:
the rod is disposed with an elongated sliding groove in an up and down direction,
a groove opening of the elongated sliding groove defines a narrowed-opening shape,
the base is slidably disposed in the elongated sliding groove, and
the friction pad abuts a groove bottom surface of the elongated sliding groove.

13. The shower plug bracket according to claim 2, wherein:
the base is disposed on a rod and is configured to be lifted up and lowered down,
the base is disposed with a friction pad configured to abut the rod to limit movement of the base,
the first component and the base cooperate with a driving structure,
an elastic member cooperates with and is disposed between the first component and the plug bracket portion,
when the plug bracket portion rotates upward or downward, the first component is driven to move in a direction away from the friction pad to enable the friction pad to be disengaged from the rod, and
when the plug bracket portion stops rotating, the first component is driven to move in a direction toward the friction pad to enable the friction pad to be reset to a state in which the friction pad abuts the rod.

14. The shower plug bracket according to claim 3, wherein:
the base is disposed on a rod and is configured to be lifted up and lowered down,
the base is disposed with a friction pad configured to abut the rod to limit movement of the base,
the first component and the base cooperate with a driving structure,
an elastic member cooperates with and is disposed between the first component and the plug bracket portion,
when the plug bracket portion rotates upward or downward, the first component is driven to move in a direction away from the friction pad to enable the friction pad to be disengaged from the rod, and
when the plug bracket portion stops rotating, the first component is driven to move in a direction toward the friction pad to enable the friction pad to be reset to a state in which the friction pad abuts the rod.

15. The shower plug bracket according to claim 14, wherein:
the base is disposed with a hollow inner cavity,
the driving structure comprises a plurality of inclined platforms circumferentially disposed on a cavity wall of the hollow inner cavity of the base and a plurality of protrusions circumferentially disposed on an outer wall surface of the first component,
the cavity wall of the hollow inner cavity of the base is disposed with limiting blocks respectively disposed on high ends and low ends of all inclined platforms of the plurality of inclined platforms,
the first component is encompassed in the hollow inner cavity of the base,
all protrusions of the plurality of protrusions slidably cooperate with inclined surfaces of the plurality of inclined platforms one-to-one and are disposed between the limiting blocks disposed on the high ends and the low ends of the plurality of inclined platforms.

16. The shower plug bracket according to claim 14, wherein:
a pressing rod is disposed on the friction pad,
the first component abuts the pressing rod or is separated from the pressing rod by an axial movement,
an end of the base away from the plug bracket portion is disposed with an accommodating groove, a groove bottom of the accommodating groove is disposed with a through hole configured to enable the pressing rod to pass through and to lead to a hollow inner cavity of the base, the friction pad is disposed in the accommodating groove, a side wall of the friction pad is disposed with a reverse buckle, and the reverse buckle cooperates with a buckle hole disposed on a groove wall of the accommodating groove.

17. The shower plug bracket according to claim 14, wherein:

the plug bracket portion comprises a plug bracket and a joint, the plug bracket is disposed with an accommodating cavity, a center of the accommodating cavity is disposed with a support column, the plug bracket is rotatably connected to the base by the support column, the joint and the second component are disposed in the accommodating cavity and both encompass the support column of the plug bracket, the joint and the plug bracket cooperate with a first anti-rotation structure, and the joint and the second component cooperate with a second anti-rotation structure.

18. A moving assembly, comprising:

the rod, and the shower plug bracket according to claim 5.

19. A moving assembly, comprising:

the rod, and the shower plug bracket according to claim 6.

20. A moving assembly, comprising:

the rod, and the shower plug bracket according to claim 7.

* * * * *